US008175989B1

United States Patent
Gopinath et al.

(10) Patent No.: US 8,175,989 B1
(45) Date of Patent: May 8, 2012

(54) MUSIC RECOMMENDATION SYSTEM USING A PERSONALIZED CHOICE SET

(75) Inventors: Dinesh Gopinath, Cambridge, MA (US); Jayendu S. Patel, Cambridge, MA (US)

(73) Assignee: ChoiceStream, Inc., Cambridge, MA (US)

( * ) Notice: Subject to any disclaimer, the term of this patent is extended or adjusted under 35 U.S.C. 154(b) by 1093 days.

(21) Appl. No.: 11/968,999

(22) Filed: Jan. 3, 2008

Related U.S. Application Data (60) Provisional application No. 60/883,374, filed on Jan. 4, 2007.

(51) Int. Cl.
*G06F 17/00* (2006.01)
*G06N 5/00* (2006.01)

(52) U.S. Cl. .............................. 706/45; 706/46; 706/47

(58) Field of Classification Search ........................ None
See application file for complete search history.

(56) References Cited

U.S. PATENT DOCUMENTS

| | | |
|---|---|---|
| 4,775,935 A | 10/1988 | Yourick |
| 4,870,579 A | 9/1989 | Hey |
| 5,107,419 A | 4/1992 | MacPhail |
| 5,132,900 A | 7/1992 | Gilchrist et al. |
| 5,167,011 A | 11/1992 | Priest |
| 5,321,833 A | 6/1994 | Chang et al. |
| 5,333,266 A | 7/1994 | Boaz et al. |
| 5,377,354 A | 12/1994 | Scannell et al. |
| 5,446,891 A | 8/1995 | Kaplan et al. |
| 5,504,896 A | 4/1996 | Schell et al. |
| 5,576,954 A | 11/1996 | Driscoll |
| 5,583,763 A | 12/1996 | Atcheson et al. |
| 5,619,709 A | 4/1997 | Caid et al. |
| 5,724,567 A | 3/1998 | Rose et al. |
| 5,754,938 A | 5/1998 | Herz et al. |
| 5,754,939 A | 5/1998 | Herz et al. |
| 5,758,257 A | 5/1998 | Herz et al. |
| 5,790,426 A | 8/1998 | Robinson |
| 5,794,210 A | 8/1998 | Goldhaber et al. |
| 5,835,087 A | 11/1998 | Herz et al. |
| 5,867,799 A | 2/1999 | Lang et al. |
| 5,893,092 A | 4/1999 | Driscoll |
| 5,983,214 A | 11/1999 | Lang et al. |

(Continued)

FOREIGN PATENT DOCUMENTS

EP   1 065 616   1/2001

(Continued)

OTHER PUBLICATIONS

Shardanand et al., U., "Social Information Filtering for Music Recommendation", MIT, pp. 1-93, Sep. 1994.*

(Continued)

*Primary Examiner* — Alan Chen
*Assistant Examiner* — Adrian Kennedy
(74) *Attorney, Agent, or Firm* — Occhiuti Rohlicek & Tsao LLP (57) ABSTRACT

A method for recommending items includes forming one or more choice sets of recommendable items. At least one choice set is a personalized choice set of recommendable items formed for a first user based in part on data associated with that user. Recommendable items can be divided into classification groups. Forming a choice set of recommendable items can be based on a user's classification group preferences. The method also includes forming a recommendation set of recommendable items from the choice sets of recommendable items. Forming the recommendation set is based in part on additional data associated with the user. The additional data is not used in forming the personalized choice set.

24 Claims, 2 Drawing Sheets

U.S. PATENT DOCUMENTS

| | | | |
|---|---|---|---|
| 6,029,195 | A | 2/2000 | Herz |
| 6,041,311 | A | 3/2000 | Chislenko et al. |
| 6,049,777 | A | 4/2000 | Sheena et al. |
| 6,052,122 | A | 4/2000 | Sutcliffe et al. |
| 6,064,980 | A | 5/2000 | Jacobi et al. |
| 6,078,740 | A | 6/2000 | DeTreville |
| 6,092,049 | A | 7/2000 | Chislenko et al. |
| 6,108,493 | A | 8/2000 | Miller et al. |
| 6,202,058 | B1 | 3/2001 | Rose et al. |
| 6,266,649 | B1 | 7/2001 | Linden et al. |
| 6,308,175 | B1 | 10/2001 | Lang et al. |
| 6,314,420 | B1 | 11/2001 | Lang et al. |
| 6,321,179 | B1 | 11/2001 | Glance et al. |
| 6,330,546 | B1 | 12/2001 | Gopinathan et al. |
| 6,356,879 | B2 | 3/2002 | Aggarwal et al. |
| 6,460,036 | B1 | 10/2002 | Herz |
| 6,487,541 | B1 | 11/2002 | Aggarwal et al. |
| 6,539,375 | B2 | 3/2003 | Kawasaki |
| 6,591,248 | B1 | 7/2003 | Nakamura et al. |
| 6,636,836 | B1 | 10/2003 | Pyo |
| 6,711,581 | B2 | 3/2004 | Rebane |
| 6,745,184 | B1 | 6/2004 | Choi et al. |
| 6,775,664 | B2 | 8/2004 | Lang et al. |
| 6,782,370 | B1 | 8/2004 | Stack |
| 6,895,385 | B1 | 5/2005 | Zacharia et al. |
| 6,907,566 | B1 | 6/2005 | McElfresh et al. |
| 7,039,599 | B2 | 5/2006 | Merriman et al. |
| 7,072,846 | B1 | 7/2006 | Robinson |
| 7,113,917 | B2 | 9/2006 | Jacobi et al. |
| 7,136,875 | B2 | 11/2006 | Anderson et al. |
| 7,370,002 | B2 | 5/2008 | Heckerman et al. |
| 7,412,202 | B2 * | 8/2008 | Gutta et al. .................. 455/3.01 |
| 7,653,594 | B2 | 1/2010 | Davis |
| 7,698,163 | B2 | 4/2010 | Reed et al. |
| 2001/0049623 | A1 | 12/2001 | Aggarwal et al. |
| 2002/0019763 | A1 | 2/2002 | Linden et al. |
| 2002/0052873 | A1 | 5/2002 | Delgado et al. |
| 2002/0056093 | A1 | 5/2002 | Kunkel et al. |
| 2002/0062268 | A1 | 5/2002 | Sato et al. |
| 2002/0099594 | A1 | 7/2002 | Heard |
| 2002/0103692 | A1 | 8/2002 | Rosenberg et al. |
| 2002/0116291 | A1 | 8/2002 | Grasso et al. |
| 2002/0147628 | A1 | 10/2002 | Specter et al. |
| 2002/0161664 | A1 | 10/2002 | Shaya et al. |
| 2002/0173971 | A1 | 11/2002 | Stripe et al. |
| 2002/0184139 | A1 | 12/2002 | Chickering et al. |
| 2003/0014759 | A1 | 1/2003 | Van Stam |
| 2003/0024817 | A1 | 2/2003 | Chun et al. |
| 2003/0033196 | A1 | 2/2003 | Tomlin |
| 2003/0040952 | A1 | 2/2003 | Keil et al. |
| 2003/0088458 | A1 | 5/2003 | Afeyan et al. |
| 2003/0089218 | A1 | 5/2003 | Gang et al. |
| 2003/0126013 | A1 | 7/2003 | Shand |
| 2003/0139957 | A1 | 7/2003 | Satchwell |
| 2003/0154092 | A1 | 8/2003 | Bouron et al. |
| 2003/0195793 | A1 | 10/2003 | Jain et al. |
| 2003/0229537 | A1 * | 12/2003 | Dunning et al. ................ 705/10 |
| 2004/0054572 | A1 | 3/2004 | Oldale et al. |
| 2004/0059626 | A1 | 3/2004 | Smallwood |
| 2004/0103058 | A1 | 5/2004 | Hamilton |
| 2004/0181441 | A1 | 9/2004 | Fung et al. |
| 2005/0021397 | A1 | 1/2005 | Cui et al. |
| 2005/0038893 | A1 | 2/2005 | Graham |
| 2005/0131762 | A1 | 6/2005 | Bharat et al. |
| 2006/0083119 | A1 * | 4/2006 | Hayes ........................ 369/30.09 |
| 2006/0167576 | A1 * | 7/2006 | Rosenberg ..................... 700/94 |
| 2006/0195516 | A1 * | 8/2006 | Beaupre ........................ 709/203 |
| 2006/0195790 | A1 * | 8/2006 | Beaupre et al. ............... 715/727 |
| 2006/0212350 | A1 | 9/2006 | Ellis et al. |
| 2007/0060099 | A1 | 3/2007 | Ramer et al. |
| 2009/0193458 | A1 | 7/2009 | Finseth et al. |

FOREIGN PATENT DOCUMENTS

| | | |
|---|---|---|
| JP | 09/153027 | 6/1997 |
| JP | 10-134080 | 5/1998 |
| JP | 2000/090094 | 3/2000 |
| JP | 2000-163477 | 6/2000 |
| JP | 2002/024694 | 1/2002 |
| JP | 2002/230417 | 8/2002 |
| KR | 1020010029099 | 4/2001 |
| WO | 95/29451 | 11/1995 |
| WO | 00/57312 | 9/2000 |
| WO | 01/37162 | 5/2001 |
| WO | 2005/065229 | 7/2005 |

OTHER PUBLICATIONS

Celma et al., O., "Getting Music Recommendations and Filtering Newsfeeds From FOAF Descriptions", pp. 1-9, 2005.*

Celma et al., O., "FOAFing the Music: A Music Recommendation System Based on RSS Feeds and User Preferences", pp. 1-4, 2005.*

U.S. Appl. No. 10/388,362, filed Mar. 12, 2003, Rose.

U.S. Appl. No. 11/499,819, filed Aug. 13, 2006, Rose et al.

M. Pazzani, J. Muramatsu and D. Billsus, "Syskill & Webert: Identifying interesting Web Sites", In Proceedings of the Thirteenth National Conference on Artificial Intelligence, pp. 54-61, Portland, 1996.

William K. Cheung, James T. Kwok, Martin H. Law & Kwok-Ching Tsui. "Mining customer preference ratings for product recommendation using the support of vector machine and the latent class model", Department of Computer Science, Hong Kong Baptist University, Kowloon Tong Hong Kong, Intelligent Systems Reasearch Group, BT Laboratories, 1999.

A. I. Schein, A. Popescul, and L. H. Ungar. PennAspect: A two-way aspect model implementation. Technical Report MS-CIS-01-25, Department of Computer and Information Science, The University of Pennsylvania.

Andrew I. Schein, Alexandrin Popescul, Lyle H. Ungar, and David M. Pennock. "Generative models for cold-start recommendations." In Proceedings of the 2001 SIGIR Workshop on Recommender Systems.

Asim Ansari et al., "Internet Recommendation Systems", JMR, Journal of Marketing Research vol. XXXVII, pp. 363-375, Aug. 2000.

C.H. Papadimitriou, P. Raghavan, H. Tamaki, and S. Vempala. Latent Semantic Indexing: A Probabilistic Analysis. In Prooceedings of the ACM Conference on Principles of Database Systems (PODS), Seattle (to appear), 1998.

Pazzani, M., Billsus, D., Learning and Revising User Profiles: The Identification of Interesting Web Sites, Machine Learning 27, Kluwer Academic Publishers, pp. 313-331, 1997.

A. Popescul, L. H. Ungar, D. M. Pennock, and S. Lawrence. Probabilistic models for unified collaborative and content-based recommendation in sparse-data environments. In Proceedings of the Seventeenth Conference on Uncertainty in Artificial Intelligence, 2001.

R.J. Mooney and L. Roy. Content-based book recommending using learning for text categorization. In SIGIR'99 Workshop on Recommender Systems: Algorithms and Evaluation, 1999.

Andreas Mild & Martin Natter, "Academic Papers, Collaborative filtering or regression models for Internet recommendation systems?", Journal of Targeting, Measurement and Analysis for Marketing, Henry Stewart Publications 0967-3237, vol. 10, 4, pp. 304-313, 2002.

Mooney, R. J., Bennett, P. N., & Roy, L. (1998). Book recommending using text categorization with extracted information. Proceedings of the AAAI Workshop on Recommender Systems (pp. 70-74). Madison, WI: AAAI Press.

Christopher Avery et al., "The Market for Evaluations", The American Economic Review, vol. 89, No. 3, pp. 564-586, Jun. 1999.

Kumar et al., "Recommendation systems: a probabilistic analysis", IBM Almaden Research Center, IEEE Computer Society, 1998.

B.P.S. Murthi and Sumit Sarkar, "The role of the Management Sciences in Research on Personalization", Management Science, Informs, vol. 49, No. 10, pp. 1344-1362, Oct. 2003.

Net Perceptions, www.netperceptions.com, Jan. 18, 1997 [retrieved Oct. 11, 2006], pp. 1-24, retrieved from: Google.com and archive.org.

Gediminas Adomavicius & Alexander Tuzhilin, "Extending Recommender Systems: A Multidimensional Approach", IJCAI-01 Workshop on Intelligent Techniques for Web Personalization (ITWP'2001), Seattle, Washington, Aug. 2001, five pages.

Billsus, D. & Pazzani, M. "Revising User Profiles: The Search for Interesting Web Sites", In Proceedings of the Third International Workshop on Multistrategy Learning, AAAI Press, twelve pages, 1996.

Crotts, Does national culture influence consumers' evaluation of travel services?, 200, Managin Service Quality, v.10, n.6, p. 410-419 (10 pages).

Fournier, The case for experience rating in medical malpractice insurance, 2001, The Journal of Risk and Insurance, v.68, n.2, p. 255-276 (22 pages).

Thierauf, Decision making through operations research, 2nd ed., 1975, Wiley series in management and administration, p. 64, 193, 195 (3 pages).

Belew, Richard K., "Adaptive Information Retrieval: Using a Connectionist Representation to Retrieve and Learn About Documents," 12th Int'l Conference on Research & Development in IR (Jun. 1989), Boston, MA.

Bookstein, Abraham, "Fuzzy Requests: An Approach to Weighted Boolean Searches," Journal of the American Society for Information Science (Jul. 1980), vol. 31, No. 4, pp. 240-247.

Bussey, Howard E. et al., "Service Architecture, Prototype Description, and Network Implications of a Personalized Information Grazing Service," IEEE INFOCOM (1990), vol. 3, pp. 1046-1053.

Chang, Shih-Chio et al., "And-LessRetrieval Toward Perfect Ranking," Proceedings of the 50th ASIS Annual Meeting (Oct. 1987), vol. 24 p. 30-35.

Chang, Shih-Chio et al, "Towards a Friendly Adaptable Information Retrieval System," Proceedings of the RIAO (Mar. 1988), pp. 172-182.

Fischer, Gerhard et al., "Information Access in Complex, Poorly Structured Information Spaces," CHI '91 Proceedings (Apr.-May 1991), pp. 63-70.

Goldberg, David et al., "Using Collaborative Filtering to Weave an Information Tapestry," Communication of the Associate for Computer Machinery (Dec. 1992), vol. 35, No. 12, pp. 61-70.

Jacobs, Paul S. et al., "Scissor: Extracting Information From On-Line News," Communications of the Association for Computing Machinery (Nov. 1990), vol. 33, No. 11, pp. 88-97.

Jennings, Andrew et al., "A Personal news Service Based on a User Model Neural Network," IEICE Transactions on Information and Systems, (Mar. 1992), vol. E75-D, No. 2, pp. 198-209.

Jennings, Andrew et al., "Customer Adaptive Communication Services," IEEE Region 10 International Conference, (Nov. 11-13, 1992), vol. 2, pp. 886-890.

Kantardzic, M. et al., "Graphical Knowledge Based Electronic Mail System," IEEE Conference (May 24, 1991), pp. 1165-1168.

Karlgren, Jussi, "Using Reader Data as a Basis for Measuring Document Proximity," An Algebra for Recommendations (date unknown), pp. 1-9.

Malone, Thomas W. et al., "The Information Lens: An Intelligent System for Information Sharing in Organizations," CHI '86 Proceedings (Apr. 1986), pp. 1-8, Boston, MA.

Mukhopadhyay, Uttam, et al., "An Intelligent System for Document Retrieval in Distributed Office Environments," Journal of the American Society for Information Science (May 1986), vol. 37, No. 3, pp. 123-135.

Reynolds, C.F., "On-Line Review: A New Application of the HICOM Conferencing System," IEEE Colloquium on 'Human Factors in Electronic Mail and Conferencing Systems'. (Feb. 3, 1989), Digest No. 20, pp. 1-4.

Rothman, Matt, "A New Music Retailing Technology says, 'Listen Here'," The New York Times (Sunday Jul. 4, 1993), pp. F8-F9.

Salton, Gerard et al., "Extended Boolean Information Retrieval," Communications of the ACM (Nov. 1983), vol. 26, No. 11, pp. 1022-1036.

Savoy, Jacques, "Searching Information in Hypertext Systems Using Multiple Sources of Evidence," International Journal of Man-Medicine Studies (Jun. 1993), vol. 38, No. 5, pp. 1017-1030.

Sheth, Beerud et al., "Evolving Agents for Personalized Information Filtering," Proceedings of the Ninth IEEE Conference on Artificial Intelligence for Applications (Mar. 5, 1993), pp. 345-352.

Spoerri, Anselm, "Visual Tools for Information Retrieval," IEEE Conference (Aug. 27, 1993), pp. 160-168.

Stanfill, Craig, "Massively Parallel Information Retrieval for Wide Area Information Servers," IEEE International Conference on Systems, Man, and Cybernetics (Oct. 13-16, 1991), vol. 1, pp. 679-682.

Terry, Douglas B., "Replication in an Information Filtering System," IEEE Conference (Nov. 13, 1992), pp. 66-67.

Wyle, M.F. et al., "A Wide Area Network Information Filter," IEEE Conference (Oct. 11, 1991), pp. 10-15.

"Announcement of Bellcore Video Rating System," (Nov. 1, 1993).

Pemberton et al., "GroupMark: A WWW Recommender System Combining Collaborative and Information Filtering," 6th ERCIM Workshop "User Interfaces for All", CNR-IROE, Florence Italy, Oct. 25-26, 2000.

Herlocker et al., "Explaining Collaborative Filtering Recommendations," CSCW'00, Philadelphia, PA Dec. 2-6, 2000.

Schafer et al., "E-Commerce Recommendation Applications," Data Mining and Knowledge Discovery, 5: 115-153 (2001).

* cited by examiner

MUSIC RECOMMENDATION SYSTEM USING A PERSONALIZED CHOICE SET

CROSS-REFERENCE TO RELATED APPLICATIONS

This application claims the benefit of U.S. Provisional Application No. 60/883,374 filed Jan. 4, 2007, the contents of which are incorporated herein by reference in its entirety.

BACKGROUND

This invention relates to music recommendation systems.

Automated systems for providing music recommendations to consumers have been deployed, for example, in the context of online music shopping. One approach is to identify a set of best-matching items for a consumer.

SUMMARY

In one aspect, in general, a method for recommending items includes forming one or more choice sets of recommendable items. At least one choice set is a personalized choice set of recommendable items formed for a first user based in part on data associated with that user. Recommendable items can be divided into classification groups. For example, music can be classified by normalized genre. Forming a choice set of recommendable items can be based on a user's classification group preferences. The method also includes forming a recommendation set of recommendable items from the choice sets of recommendable items. Forming the recommendation set is based in part on additional data associated with the user. The additional data is not used in forming the personalized choice set.

Aspects can include one or more of the following:

The method can further include presenting the recommendation set of recommendable items to the user.

Recommendable items can include media items, audio, and music. Recommendable items can also include aggregations of recommendable items, for example a playlist of songs.

Forming choice sets is based on activity history associated with a user.

The recommendation set is formed based on a user's preference data. The preference data can be derived, at least in part, from activity history associated with the user. Forming the recommendation set can also include applying configurable criteria not specific to the user and not used in forming a choice set.

Recommendable items can be associated with a corresponding creative party. For example, a creative party might be a composer, a lyricist, an author, a performer, a band, a producer, an editor, or anyone else involved in the marketing or creation of the item. Items may be associated with attributes characterizing the item. Choice sets can be formed based on attributes of items. A choice set might be restricted to items that share at least one common attribute. Creative parties may also be associated with attributes characterizing the creative party. Choice sets can be formed based on attributes of creative parties. A choice set might be restricted to items associated with creative parties that share at least one common attribute.

Forming a personalized choice set for a user can include selecting items associated with creative parties where the creative parties are represented by items in a user history associated with the user. Forming a personalized choice set for a user can also include selecting items associated with creative parties similar to creative parties represented by items in a user history associated with the user. A creative party can be represented by an item if the item is associated with the creative party. Similarity can be defined by attributes. Similarity can be established using a similarity table.

Data about a user can include recommendable item attribute preferences. Preferences can be derived from an activity history associated with the user or through other means including surveys and rankings. Recommendation sets can be formed based in part on a user's recommendable item attribute preferences. Recommendation sets can also be formed for a user based in part on other user's recommendable item attribute preferences.

In another aspect, in general, one or more choice sets of recommendable items are formed. This includes forming for a first user at least one personalized choice set of recommendable items. Forming the personalized choice set uses a first method of a first methodology. The first method is adapted to the first user. A recommendation set of recommendable items is formed from the choice sets of recommendable items using a second method. The second method is different than the first method, and is also adapted to the first user.

Aspects may include one or more of the following:

The second method is of a second methodology different from the first methodology. In some examples, the first methodology comprises an item correlation based methodology. In some examples, the second methodology comprises a user profile based methodology.

The recommendation set of recommendable items is presented to the first user.

The recommendable items comprise media items and/or aggregations of media items. In some examples, the media items comprise audio items.

In another aspect, in general, an approach to music recommendation makes use of statistical modeling at multiple levels. As an example, user preferences for music are modeled at an artist, a song, and an album level.

Music recommendations may be made separately at each of the multiple levels.

Common modeling of user preferences can be used for multiple different types of recommendations. For example, recommendation of artists, albums given artist, albums, songs given album, songs given artist, and songs may all be based on the common modeling.

Cross-genre recommendations can be made using the multiple level modeling.

In another aspect, in general, an approach to music recommendation makes use of a user preference model that permits a user to have multiple disparate preference "pockets" (e.g., clusters, concentrations, regions). Preference parameters for a user are maintained using the multiple preference pockets, for example, by maintaining a separate preference profile for each pocket.

A portfolio of recommendations for a user may be made be selecting separate recommendations from each of multiple (or all) of the user's preference pockets.

A user's fractional interest in each of multiple pockets of interest can be used to construct the portfolio, for example, providing more items from a pocket of interest that the user has interest in.

Other features and advantages of the invention are apparent from the following description, and from the claims.

DESCRIPTION

1 Overview

People discover new music in a variety of ways, including on- and off-line conversations with friends and exposure to electronic and print media outlets. In this description, techniques for enabling a user to discover new music are described in an exemplary context of a user's interactions with a music distribution application. The techniques are implemented by a personalized music recommendation platform that draws upon a particular user's music distribution application usage history, the usage history of the music distribution application by other users, and the application context (e.g., subscription-based application context, transaction-based application context, and/or advertisement-based application context) in which the particular user is interacting with the music distribution application, to provide personalized music recommendations that reflect the user's music preferences.

In general, a user's music preferences can be characterized as discontinuous and concentrated about scattered pockets of interest in a high-dimensional attribute space. Details about attributes are described below. Users' activity represents samples from these discontinuous pockets of interest. A reasonable, personalized choice-set could be constructed by a union of attribute-based small neighborhoods associated with downloads and positive ratings. A choice-set construction algorithm can draw on editorial information on nearness and key attributes, including attributes constructed from item-based closeness as indicated through collaborative filtering.

The recommendation platform presented here divides the music catalog into paths representing common pockets of interest. A path is defined by a set of common attributes and may correspond to a single genre of music (e.g., a "rock" path corresponding to the "rock" genre) or a grouping of music genres that share common attributes (e.g., a "country" path representative of the grouping of the "country" and "folk" genres). Intra-path music comparisons rely on the common attributes that define the path. Different paths may have different available attributes and may use different approaches to intra-path comparisons as a result. Users with a preference for a path may be grouped into a single path-specific cohort or divided into multiple path-specific cohorts constructed such that significant same-path, between-cohort differences emerge in the distribution of user preferences. Each cohort is populated by users whose music distribution application usage histories indicate a similarity in the users' preferences for music of the particular path with which the respective cohort is associated. The number of cohorts depends on the trade-off between predictive accuracy and cohort sizes. For example, 6 to 10 cohorts per path might be used to balance this trade-off.

To generate personalized music recommendations for a particular user, the recommendation platform first predicts the user's preferred paths and assigns the user to a cohort for each preferred path. The path preference predictions and path-specific cohort assignments are based on the user's music distribution system usage history. The usage history may include the user's purchasing history, exploratory activity, ratings, favorites, playlists, and survey responses. For each cohort to which the user is assigned, the recommendation platform generates one or more choice sets of music items within the cohort's associated path, and computes predicted user-specific ratings for all or a portion of the music items in the choice set(s). The term "music item" as used in this description refers to any distinct recommendable item, which may be presented as a hyperlink the user can follow. Selecting the recommended item, e.g. following the link, may result in a download or purchase of a snippet of a music track, a music track in its entirety, or a playlist formed by a collection of music tracks, or the action may result in loading a webpage featuring reviews of a playlist (which in this context is probably an album), a description of an artist's music, or a message board where users discuss an artist. Label- and artist-released albums are examples of playlists. Other examples of playlists include user-specified playlists (e.g., a collection of music tracks selected by a user of the music distribution application to form a playlist), editor-specified playlists (e.g., a collection of music tracks selected by a professional working with the operator of the music distribution application to form a playlist), and system-specified playlists (e.g., a collection of music tracks selected by the recommendation platform and/or the music distribution application to form a playlist). The music tracks that form a playlist may include music tracks from one or more label- and/or artist-released albums.

The recommendation platform predicts user-specific preferences for music items of multiple paths and uses the predictions and the application context in which the user is interacting with the music distribution application to identify a set of music items for presentation to the user. Details about different prediction methodologies and the use of the application context in determining which music items are selected for presentation to the user are provided below.

Representations of the identified music items of the set may be presented to the user through a user interface of the music distribution application. Feedback about music items that have been recommended to a particular user may be used by the recommendation platform to refine further recommendations. Feedback may come in the form of user activities including, for example, clicks, ratings, or purchases.

2 Architecture

Figure 1:
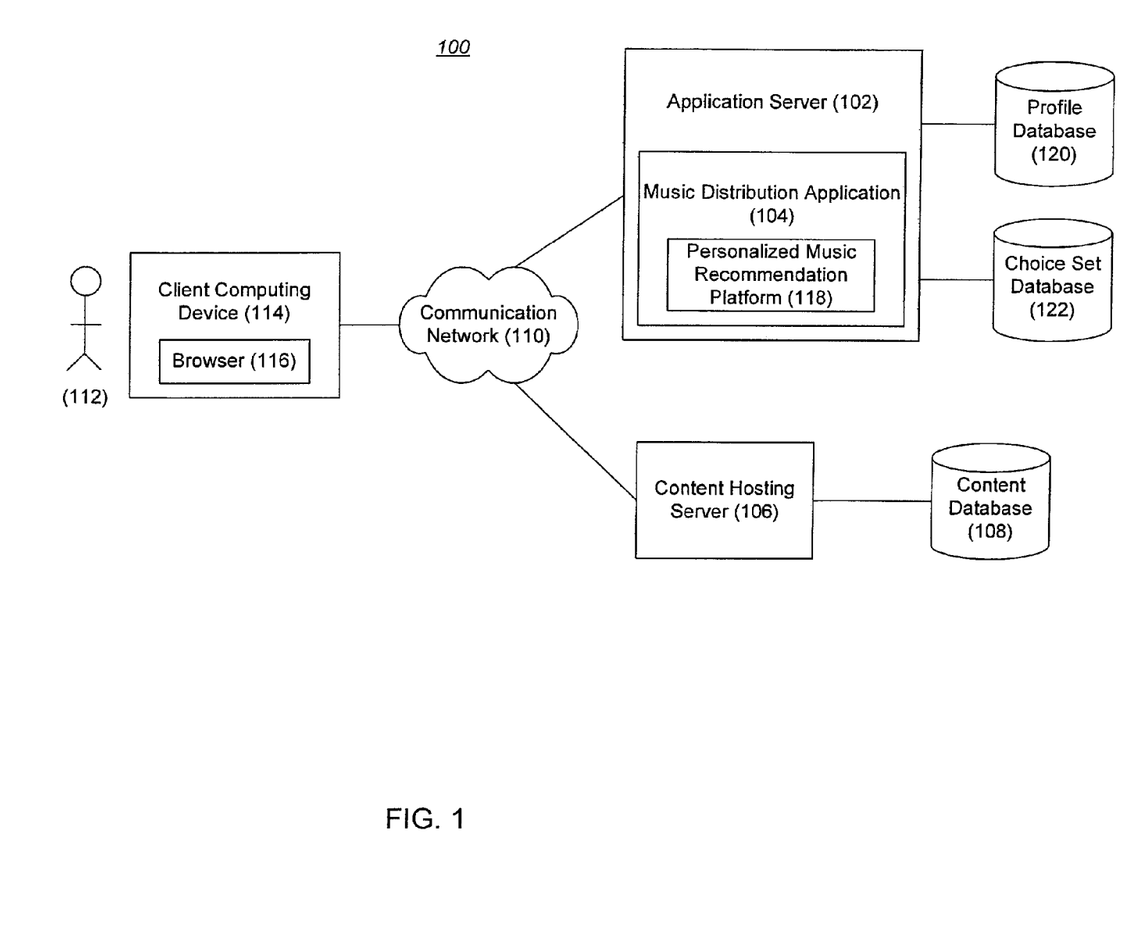
FIG. 1 is a block diagram of a music distribution network.

Referring to FIG. 1, in one example, a music distribution network 100 includes an application server 102 running a music distribution application 104, a content hosting server 106 storing or otherwise having access to one or more databases of music tracks (e.g., content database 108), each associated with one or more content providers, and a communication network 110 that enables users at client computing devices (e.g., a user 112 at a client computing device 114) to acquire music tracks through interactions with the music distribution application 104.

The communication network 110 is a network of devices that transmit data and can be implemented in a variety of ways. For example, the communication network 110 may include any kind and any combination of networks such as an Internet, a local area network (LAN) or other local network, a private network, a public network, a plain old telephone system (POTS), or other similar wired or wireless networks. The communication network 110 can also include additional elements such as communication links, proxy servers, firewalls or other security mechanisms, Internet Service Providers (ISPs), gatekeepers, gateways, switches, routers, hubs, client terminals, and other elements. Communications through the communication network 110 can include any kind and any combination of communication links such as modem links, Ethernet links, cables, point-to-point links, infrared connections, fiber optic links, wireless links, cellular links, Bluetooth®, satellite links, and other similar links. The transmission of data through the communication network 110 can be performed using any available communication protocol, such as TCP/IP. Communications through the communication network 110 may be secured with a mechanism such as encryption, a security protocol, or other type of similar mechanism.

The client computing device 114 may be implemented as a mobile device such as a cellular telephone, a wireless PDA, a handheld gaming device, a wireless laptop computer, or a stationary device such as a desktop computer, set-top box for a television, or other fixed device, with which wired and/or wireless communication can be enabled. The client computing device 114 includes a graphical user interface and/or a Web browser 116 through which the user 112 can provide input to, or otherwise interact with, the music distribution application 104.

In the FIG. 1 example, the actions recommended are the purchase and download of tracks and playlists. Each track is stored in a content database 108 and is associated with a content identifier (e.g., a string of alphanumeric characters). The content identifier uniquely identifies its associated item of content from amongst the items of content that are available for retrieval from the content database 108. Each playlist is a set of tracks stored as a list of track-specific content identifiers. Each playlist is associated with a unique content identifier and stored in the content database 108. Each track is also associated with one or more artists. Each track, playlist, and artist is associated with a item-profile stored in a profile database 120. Each item-profile contains track-, playlist-, or artist-specific item data, which may include explicit features, explicit attributes derived deterministically from those features, and latent attributes estimated from explicit features, measurable activity, and expert knowledge.

When content is entered into the content database 108, the content-specific profile is initialized with known features and initial attributes. Attributes can be retrieved from an attribute database populated by experts or outside analysis (e.g. a database available from All Music Group [AMG]) or the attributes can be generated by a personalized music recommendation platform 118 implemented, in this example, as a module of the music distribution application 104 (as depicted in FIG. 1). As content is selected by users, latent attributes in the content-specific profile may be generated and/or updated.

Attribute analysis (also referred to in this description as a "content attributizing process") results in K explicit and latent attributes $x_{ik}$, which are represented as a K-dimensional vector $x_i$. Each attribute $x_{ik}$ is a numeric quantity, such as a binary number indicating the presence or absence of a particular attribute, a scalar quantity that indicates the degree to which a particular attribute is present, or a scalar quantity that indicates the intensity of the attribute. The attributes used may vary between paths. Some examples of such attributes include degrees of "electric" versus acoustic instrumentation, of lyricism, and of appropriateness for dancing.

The track-level item data includes attributes that characterize the track at a track-level. Examples of track-level attributes include year released, highest ranking on a popularity chart such as Billboard, or recording location (e.g. live concert or studio). The artist-level item data includes attributes that characterize the artist at an artist-level. Examples of artist-level attributes include composite attributes related to the artist's tracks and albums as well as more general statistical and editorial attributes such as number of albums released, awards won, critics' ratings, artist importance, artist independence, sales figures, or touring success. The playlist-level item data includes attributes that characterize the playlist at a playlist-level. Examples of playlist-level attributes include composite attributes related to the tracks on the playlist as well as more general statistical and editorial attributes such as number of playlists sold, critics' ratings, recording label size (for playlists constituting a label-released album), age of the playlist, whether the tracks(s) on the playlist were recorded in a studio or from a live concert, whether the playlist is primarily original recordings or a "best-of" or multiple artist compilation, or the overall sound of the playlist.

In addition to maintaining artist, playlist, and track profiles, the recommendation platform 118 also maintains user profiles. During an initial enrollment phase with the music distribution application 104, demographic information (e.g., age and gender) about a user may be elicited and stored as part of the user's user profile. Over time, additional information ("activity information") about the user is obtained through the user's use of the music distribution application and stored as part of the user's user profile. For example, the user can provide a rating for an album that he has purchased, possibly after that album was previously recommended to the user by the recommendation platform 118. The recommendation platform 118 also supports an elicitation mode in which ratings for music tracks, albums, playlists, and/or artists are elicited from a user, for example, by presenting a short list of music tracks, albums, playlists, and/or artists in the initial enrollment phase for the user, and asking the user to rate those music tracks, albums, playlists, and/or artists with which the user is familiar or allowing the user to supply a list of favorites. The elicitation mode may be part of the enrollment phase, may be entered after a triggering event such as the user's fifth purchase, and/or may be initiated as a user option. The history of interactions may also include the user's responses to direct questions and surveys, the user's purchases or selections, the user's clicks, the user's searches, and any other event that provides relevant preference information.

In addition to demographic information and activity information, each user profile also includes path-specific attribute preference information. The recommendation platform 118 performs a content preference attributizing process in which the activity information of each user profile within the profile database 120 is analyzed. The analysis is performed for each path in which the user has history. The analysis within each path relies on the key attributes and nature of the path. This set of key attributes may be identical to the set of key attributes used by the recommendation platform during the content attributizing process, a (proper) subset thereof, or a (proper) superset thereof. The content preference attributizing process may occur at periodic intervals or in response to a triggering event, for example the addition of new activity information to a user profile or a user request for recommendations. For each user, the result of the content preference attributizing process is one or more path-specific preference vectors, where each path-specific preference vector includes K explicit and latent attributes $z_{ik}$, which are represented as a K-dimensional vector $z_i$. Each attribute $z_{ik}$ is a numeric quantity, such as a binary number indicating the presence or absence of a particular attribute, a scalar quantity that indicates the degree to which a particular attribute is present, or a scalar quantity that indicates the intensity of the attribute. Path-specific preference vectors enumerate users' path-specific attribute preferences and can be stored in the respective user's user profile or constructed as needed.

The recommendation platform 118 uses statistical techniques (e.g., estimated regression models employing latent classes such as those described in U.S. application Ser. No. 10/643,439, entitled "Statistical Personalized Recommendation System," filed on Aug. 19, 2003, the contents of which are incorporated herein by reference in its entirety) on the activity information and/or the path-specific attribute preference information stored as part of the user's user profile to assign the user to one or more cohorts.

3 Operation

Figure 2:
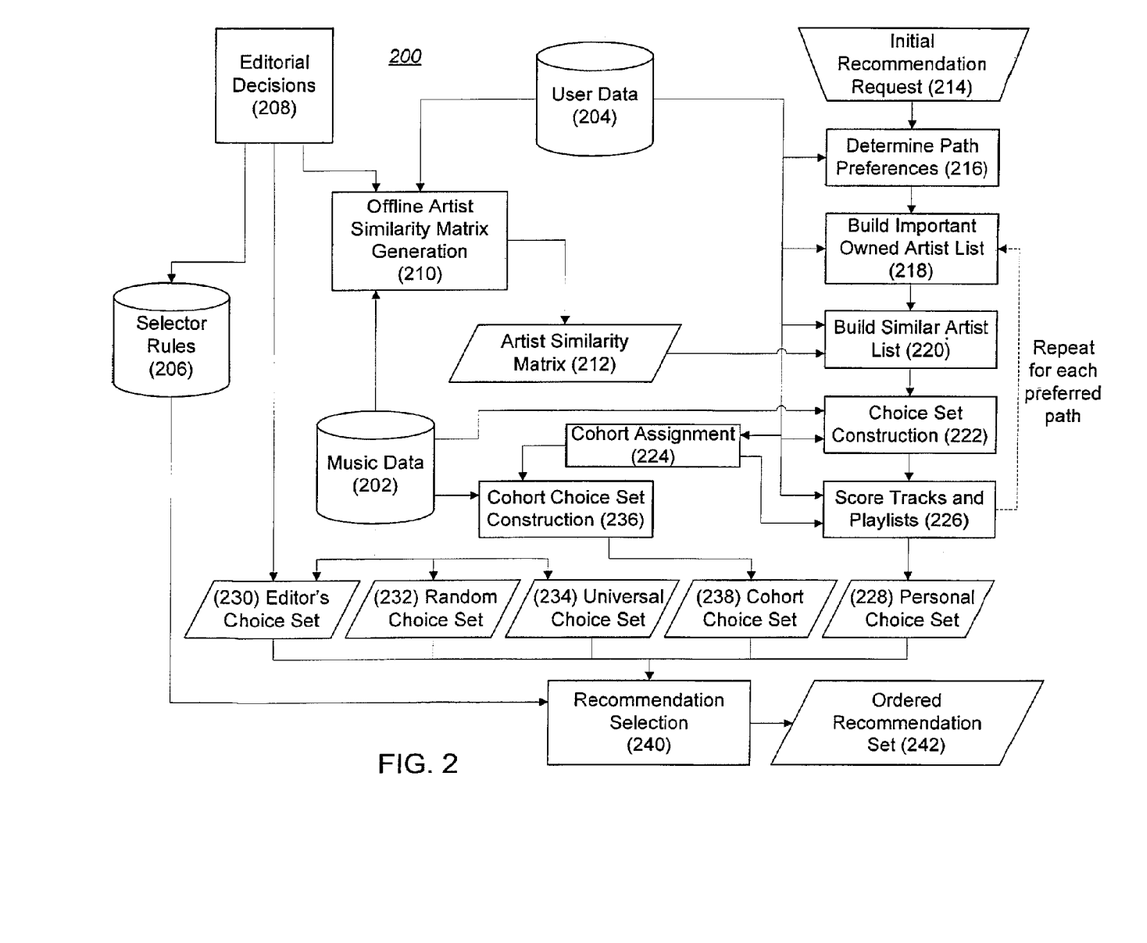
FIG. 2 is a block diagram of a recommendation system.

Referring to FIG. 2, in one example, the recommendation selection system 200 has music data 202, which includes the catalog of available music and associated music profiles and attributes, and user data 204, which includes user profiles and system activity. The system 200 also has a database or table of recommendation selection rules 206 determined by editors 208. Periodically an offline artist similarity matrix generation process 210 reconstructs an artist similarity matrix 212, relying on artist attributes 202, editorial opinions 208, and purchase correlations in users' histories 204.

In this example system 200, when an event triggers recommendation generation 214, the system processes the user's activity history 204 to determine the user's path preferences 216. For each preferred path an important owned artist list is constructed 218 of the important artists in the user's activity history 204. A list of artists similar to the owned artists is constructed 220 using the artist similarity matrix 212. Tracks and playlists produced by the owned and similar artists are collected from the music data 202 to form an initial choice set 222.

In this example system 200, users can be assigned to cohorts of similar users 224 based on user attributes and activity 204. The user's profile 204 and the user's cohort 224 are used to score 226 the tracks and playlists in the initial choice set 222. The collection of scored initial choice sets for each preferred path form a personalized choice set 228.

Additional choice sets are available in this example system 200. An editor's choice set 230 can be assembled by editors 208. A random choice set 232 can be selected from the music catalog 202. The entire catalog constitutes a universal choice set 234. A cohort choice set construction process 236 can assemble music 202 for the user's cohort 224 into a cohort choice set 238.

In this example system 200, a recommendation selection process 240 uses the selector rules 206 to select tracks and playlists from the various choice sets: the editor's choice set 230, the random choice set 232, the universal choice set 234, the cohort choice set 238, and the personalized choice set 228. The selection process 240 produces an ordered recommendation set 242 for presentation to the user.

A. Music Data 202

In a system where music is sold or delivered, there is a distinction between the music itself—typically stored as an audio file with the data necessary to reconstruct the sound of the music—and the data used to describe and manage the audio. These technical details are well understood in the art and so are not repeated here. This description treats a track or track profile as a file or database entry containing the necessary track-level data including a unique identifier to the track's audio file, a unique identifier to the track's artist, any relevant features or attributes of the track, and any other recordable information used by the system. Likewise, a playlist or playlist profile is a file or database entry containing the necessary playlist-level data including a set of unique identifiers to the playlist's tracks, a unique identifier to the playlist's artist, any relevant features or attributes of the playlist, and any other recordable information used by the system. And similarly, an artist or artist profile is a file or database entry containing the necessary artist-level data including a unique identifier for the artist, a set of unique identifiers to the artist's tracks and playlists, any relevant features or attributes of the artist, and any other recordable information used by the system. The catalog of available music is the set of track and playlist unique identifiers.

B. User Data 204

Each user has a user profile and a set of activity events. Each activity event can be a search, a click, a purchase, a download, a rating, a survey response, or any other type of interactive event handled by the system. The user profile may also contain non-event information including demographic information. The user's preferences for various artist-level, playlist-level, and track-level features and attributes can be estimated from the user profile and user activity history.

C. Artist Similarity Matrix Construction 210

Periodically, for example once a week, an artist similarity matrix 212 is constructed. In one example, the recommendation platform uses editorial decisions 208, music data 202, and user data 204 as follows:

For each known artist:
1. Make the artist similar to other artists that editors believe are similar
    a. This can be done by importing an artist similarity table from a third-party such as the All Music Group (AMG)
2. Make the artist similar to up to a fixed number of, say 10, additional artists where the artists share certain attributes
    a. Artists share an attribute when the score for that attribute in each artist's profile is within a certain range of the other's. For example, with an attribute measured on a −1 to 1 scale, two artists share that attribute if one artist's attribute value is equal to the other artist's attribute value plus or minus 0.5.
3. Make the artist similar to up to a fixed number of, say 3, additional artists where the tracks or playlists produced by the artists are similar
    a. This may be done by looking for artists where a user's purchase of a track or playlist from one artist indicates that the user is likely to purchase the tracks and playlists from the other artist. For example, where the conditional probability of buying a track or playlist from artist j given that the user bought a track or playlist from artist i exceeds the marginal probability of independently buying a track or playlist from artist j by some threshold t.

$$\frac{N(i,j)}{N(i)} - \frac{N(j)}{N} > t$$

b. This might be restricted by only looking for artists with a minimum number of sales, for example 100 tracks purchased.

D. Path Preference 216

A user's activity history 204 will be concentrated around the user's discrete discontinuous pockets of interest. The user's path preferences can be extracted from this history by looking at the quantity and frequency of events in each path.

E. Important Owned Artists 218

A user's activity history 204 includes purchase and rating activities. Any artist from whom a user has purchased a track or playlist is considered an owned artist. Any artist where the user has indicated ownership of a track or playlist from the artist or the user has given a positive rating of the artist, either directly or through the rating of an artist's track or playlist, is also considered an owned artist. Owned artists can be scored according to their importance to the user.

In one example, an artist reflected in the activity history of the user's user profile is considered to be important if one or more of the following is true: (1) at least one music item associated with the artist has been acquired by the user (e.g., through purchase or download); and (2) at least one music item associated with the artist has been explicitly rated by the user in a favorable manner (e.g., a rating of 3 or more on a scale of 1 to 5, where 1 is strongly dislike and 5 is strongly like). In another example, the recommendation platform computes an artist importance score for each artist reflected in the activity history of the user's user profile and uses the respective artist importance scores to determine which of the artists are considered to be important. The artist importance score may be a function of both how recently the artist appears in the user's history and the frequency of such appearances.

The importance $w_{jn}$ of artist j to user n can be determined, for example, by a function of the time since the user last showed an interest in the artist ($days_{jn}$) and the extent of the user's artist-relevant activity, e.g. the number of tracks purchased or rated positively ($num_{jn}$). This would give $w_{jn}$ as:

$$\omega_{jn} = \exp(-a \cdot days_{jn}) \ln(num_{jn}+1)$$

or $$\omega_{jn} = \exp(-a \cdot days) num_{jn}$$

For a positive decay constant a, which in some examples is estimated by a coarse search over a relevant range, say steps of 0.01 over [0, 0.05], so as to maximize recommendation performance success.

An alternative approach to the importance of artist j to user n is a weighted log-sum of the transactions associated with the artist j in the user's history. This replaces the time since the last activity by the user for artist j with an accounting for the times since each of the activities by the user for artist j. Let t be the index of each transaction by date:

$$\omega_{jn} = \ln(\Sigma_t \exp(-a \cdot days_{jnt}) num_{jnt}), \text{ where } a \geq 0.$$

Importance may also be influenced by the values of explicit ratings by the user. If necessary, artists below an importance threshold can be dropped from the Important Owned Artist list. Artists may be excluded for efficiency reasons or to increase the quality of the resulting recommendations.

F. Similar Artists 220

A list of artists similar to the important owned artists 218 is generated 220 using the artist similarity matrix 212. In a slight variation, the Important Artist List and the Similar Artist list can be a single list with an extra tag indicating if the artist is present in the user's history (owned) or is a similar artist.

G. Initial Choice Set Construction 222

The initial choice set is created 222 in this example by populating the set with music from the Important Owned Artists and the Similar Artists lists. For each artist with a small number of tracks or playlists add any track or playlist that does not have a user history event indicating ownership or a negative rating. A small number of playlists might be two and a small number of tracks might be twenty. For an artist with a larger number of tracks or playlists, the tracks and playlists included in the initial choice set are restricted by some set of rules. An example is to only include the union of:

a. the most recent playlist released within the last two years
b. all playlists released within the last year
c. the most popular old playlists, not to exceed 20% of old playlists, where an old playlist is one with an original release date greater than two years
d. all old playlists with popularity in the top 10% of the playlist's style
e. all playlists highly rated by editors, say with an AMG star rating greater than 7.5

Each track or playlist in the initial choice set 222 is identifiable as being from either the Important Owned Artists or the Similar Artists list. Other methodologies for constructing an initial choice set are also possible, for example construction of the initial choice set 222 could rely only on collaborative filtering.

H. Cohorts 224

Within each path, users are divided into multiple path-specific cohorts 224 based on elements from the user histories 204. A user is included in a closest-cohort, or a most-likely cohort. A cohort c is defined by a vector of shared attribute preferences $V_c$. Given a user's history $H_n$, the class membership model predicts the probability of the user being in a particular cohort c. For example, using a multinomial logit class membership model:

$$Pr(c \mid H_n) = \frac{\exp(V_c(H_n))}{\sum_{c'} \exp(V_{c'}(H_n))}$$

The determination of the cohorts (also known as classes) is undertaken in a latent-cohort regression model framework that is discussed in Section I below.

Expanding on the example, say that for a specified path the following user-history based variables can be defined:

perc_Currrent=Percentage of user's purchased or rated tracks and playlists that have a release date within the last two years perc_Mainstream=Percentage of user's purchased or rated tracks and playlists with a mainstream attribute greater than 2.5 perc__00s=Percentage of user's purchased or rated tracks and playlists that have attribute era2000plus $$\ln \text{frac\_Current} = \ln\left[\frac{\max(\text{perc\_current}, 0.001)}{1 - \max(\text{perc\_Current}, 0.001)}\right]$$

$$\ln \text{frac\_Mainstream} = \ln\left[\frac{\max(\text{perc\_Mainstream}, 0.001)}{1 - \max(\text{perc\_Mainstream}, 0.001)}\right]$$

$$\ln \text{frac\_00s} = \ln\left[\frac{\max(\text{perc\_00s}, 0.001)}{1 - \max(\text{perc\_00s}, 0.001)}\right]$$

For each user n and cohort c, the probabilities $P_{nc}$ can be computed:

1. Latent index $V_{nc}$, where the various values of $\beta_c$ are cohort specific coefficients, which can be estimated as discussed in section I below:

$$V_{nc} = \beta_{0c} + \beta_{1c} \ln \text{frac\_Current}_n + \beta_{2c} \ln \text{frac\_Mainstream}_n + \beta_{3c} \ln \text{frac\_00s}_n$$

2. Cohort membership probability $P_{ne}$ linked to the latent index $V_{nc}$:

$$P_{nc} = \frac{\exp(V_{nc})}{\sum_j \exp(V_{nj})}$$

3. The sum of possible cohort membership probabilities $P_{nc}$ over all of the available cohorts is 1:

$$\sum_c^C P_{nc} = 1$$

I. Scoring Music 226

There are many possible approaches to scoring music items. For example, in a rich attribute space, such as when AMG data is available, a Bayesian Regression Model can track and update individual user score predictions. Another approach, a Latent Cohort Regression model, focuses more on the popularity of an item within a user's likely cohort. Different approaches can also be combined to balance their respective predictive qualities.

In the Bayesian Regression Model, when a user first interacts with an artist, playlist, or track, an initial score is estimated. This initial estimate may come from the user's cohort or may be based on the user's attribute preferences in relation to the item's attributes. Each subsequent interaction results in an update to the initial score. The model system is estimated using Bayesian Markov-Chain Monte-Carlo methods to obtain cohort-level model coefficients where the cohorts are defined by combinations of variables in the array of demographics and observable preferences for a user n, $Z_n$.

A three tiered model is used to reflect these Bayesian estimates. The top tier is the artist model. The score in the artist model is computed as a product of artist-level attributes, $X_i$, found in the artist profile for artist i, and a cohort-determined coefficient $\beta$ plus a user n specific error term $\epsilon_{in}$. The attribute coefficients are determined as a function of the cohort attribute preference values $\beta_0$ and the user specific offset from the cohort, $\Gamma Z_n + \zeta_n$. Thus the artist model score $y_{in}$ for an artist i and user n is:

$$y_{in} = \beta_n' X_i + \epsilon_{in} = (\beta_0 + \Gamma Z_n + \zeta_n) X_i + \epsilon_{in}$$

The middle tier is the playlist model, where the tracks in the playlist are all from a single artist. This is primarily the case for artist and label released albums. A playlist from an artist i is denoted j(i). The playlist model reflects the attributes of the playlist $X_{j(i)}$ and the user's score for the artist i:

$$y_{j(i)n} = \alpha_n + \gamma_n(\beta_n' X_i + \epsilon_{in}) + \theta_n' X_{j(i)} + \nu_{j(i)n}$$

The lowest tier is the track model, where the track is affiliated with a primary playlist (such as the artist or label released album where the track was first released). A track from an artist i and playlist j(i) is denoted k(j(i)). The track model reflects the attributes of the track $X_{k(j(i))}$ and the user's score for the playlist j(i):

$$y_{k(j(i))n} = \lambda_n + \kappa_n(\alpha_n + \gamma_n(\beta_n' X_i + \epsilon_{in}) + \theta_n' X_{j(i)} + \nu_{j(i)n}) + \phi_n' X_{k(j(i))} + \xi_{k(j(i))n}$$

This three-tiered model enables cross-tier comparisons because the lower tier scores are reliant on higher tier scores. For example, in order to score a track k(j(i)), the playlist j(i) and the artist i must also be scored. This improves the score for the remaining tracks on the playlist j(i), for other playlists by artist i, and for the tracks on the other playlists for artist i. As a result the scores for all of the tracks and playlists from an artist benefit from each independent score.

The Latent Cohort Regression model relies on a user's activity history to predict the probability of the user being in a particular latent cohort c. Given the latent cohort, the model scores items in relation to the cohort and how close the user is to the cohort. The probability of the user being in a particular latent cohort c can be predicted using the multinomial logit class model previously presented:

$$Pr(c \mid H_n) = \frac{\exp(V_c(H_n))}{\sum_{c'} \exp(V_{c'}(H_n))}$$

Given a latent cohort, the preference regression model predicts a user's acceptance of an item i as:

$$U_{in \mid c} = g(X_{in}, \beta_c) + \Psi_{inc}$$

Thus user n's score for item i is:

$$U_{in} = \sum_{c'=1}^{C} U_{in \mid c} Pr(c' \mid H_n)$$

A similar approach is:

$$\pi_{icn} = \frac{1}{1 + \exp(-O_{ic} - Z_{in} \Gamma_c)}$$

Where $\pi_{icn}$ is the probability of interest in item i by user n belonging to cohort c. $O_{ic}$ is a score for a typical non-specific member of cohort c. $Z_{in}$ represents a vector of closeness values $\rho_{in}$ of item i to each artist j in the time-weighted transaction history of user n. Letting $\rho_{ij}$ be the user-independent closeness value between artist i and artist j, and letting $w_{jn}$ be a user-specific weight for the importance of artist j (calculated as in one of the previous examples), then $\rho_{in}$ can be determined:

$$\rho_{in} = \frac{\sum_j \rho_{ij} w_{jn}}{\sum_j w_{jn}}$$

Where $P_{nc}$ is the probability of user n belonging to cohort c, and $\pi_{icn}$ is the probability of interest in item i by user n belonging to cohort c, an item score $S_{in}$ can be determined by blending the values of $P_{icn}$ over the set of possible cohorts C:

$$S_{in} = \sum_{c=1}^{C} P_{nc} \times \pi_{icn}$$

Higher values of $S_{in}$ indicate a likely greater interest in item i by user n.

Additional information can also be factored into a score. For example, with music generated from the Important Owned Artists list, additional history attributes can be used. These include marketing attributes such as days since the user's interaction with an artist or the number of tracks or playlists purchased from the artist.

Scoring approaches can vary across an implementation but are consistent across a path. Scores are for how likely a specific or theoretical user is to select a particular artist, playlist, or track. Comparisons between two items can be premised on the item scores relative to the same user or premised on values in an overlapping attribute space.

J. Recommendation Selection 240

The recommendation system 200 creates the personalized choice set 228 as described. It can also create additional playlists, for example: an editor's choice set 230, a random choice set 232, a universal choice set 234, or a cohort choice set 238. Recommendation selection 240 can assemble a recommendation set 242 by picking tracks and playlists from any of the available choice sets. This process is governed by a set of recommendation rules 206 established by editors 208. The rules 206 may also indicate additional methodologies for reducing the available choice sets to the recommendation set 242.

A cohort choice set 238 is constructed 236 to tap into the wisdom of similar users. A simple version of a community-based choice set looks for the music selected most by members of a cohort over a time frame. A more complex and comprehensive approach is to traverse all of the music in a path, scoring each item for the likelihood of being selected by a typical non-specific user belonging to the cohort. This score can incorporate values for each item's popularity, quality, age, and other key attributes for the music within the path. It can also account for salient interactions between factors. For example, general popularity may be less significant as age increases. Factors can be given different weights to reflect their importance to the cohort. Cohort choice sets can also be augmented to include music selected by an editor.

The recommendation rules 206 may require, for example, that one-third of the music recommended to a user be selected from the cohort choice set, one-fourth of the music recommended be selected from the personalized choice set derived from the Important Owned Artists list, one-fourth of the music recommended be selected from the personalized choice set derived from the Similar Artists list, and the remaining portion to come from the editor's choice set. The system prohibits redundant recommendations, so a track selected from the cohort choice set could not also be selected from the personalized choice set. The rules 206 may require a specific ratio of tracks to playlists. Also, the rules 206 may limit the number of paths used, selecting only from the user's most preferred paths or selecting from a rotation of the user's preferred paths to induce variation.

The rules 206 may be context sensitive. For example, when a user with a system history initiates a new session, the system may present several recommendation lists, one from the user's personal history-based choice set, one from the user's most likely cohort within the user's favorite path, one from the user's most likely cohort within another user preferred path, and perhaps a list of the most popular music, regardless of path, over a recent time period.

In one example recommendation setting, where the recommendation system attends to the "pockets of interest" of the user and the user is interested in only the ROCK and POP paths, then the surfaced recommendations are deliberately distributed across those two paths of the user's interest. In a more general example:

Based on:
User's interest probability in path p for user n: $\pi_{pn}$.
For user n with more than a threshold number of history events ("heavy users") in a Bayesian regression model path p:
User n's "Own" cohort membership probability in cohort c(p) for path p: $Q^O_{c(p)n}$
User n's "Similar" cohort membership probability in cohort c(p) for path p: $Q^S_{c(p)n}$
Percentage of user's recent purchases in "own" cohort-based choice set for path p: $R^O_{pn}$; if this information is not available at the user-level, default to 50%.
Percentage of user's recent purchases in "similar" cohort-based choice set for path p: $R^S_{pn}$; if this information is not available at the user-level, default to 50%.
Path-specific, user-specific (through user's cohort membership for path p and the user-specific modifiers $Z_{in}$ for playlist i) and "own" vs. "similar" choice set specific scores: $T^O_{c(p)pn}$ and $T^S_{c(p)pn}$ respectively.

For user n with at least one history event but less than a threshold number of history events ("light users") in a Bayesian regression model path p:
Light user "module" generates a sorted list of playlists to pick playlist recommendations given the path
For user n with at least one history event in a latent cohort regression model path p:
User-specific scores $T_{pn}$ within a more prescribed choice set as in current system
Generate:
"Front page" with 4 playlist recommendations and 10 track recommendations from the user's personalized choice set. These are what the user first sees after entering the system. The page includes a link to a "more" page.
First "more" page includes:
2 additional playlist recommendations and
5 additional track recommendations
An additional "more" page
Additional "more" pages include:
6 playlist recommendations
15 track recommendations
An additional "more" page.
Performance considerations might restrict:
Number of cohorts "kept" for "own" and "similar" choice sets, i.e., a playlist in a given path and choice set type, needs to be scored as many times as the number of "kept" cohorts and to reduce scoring costs, the number of cohorts used may need to be restricted
Number of paths used in the "front page"
Number of paths used in the "more pages"
Consequently, the following simplifications might be used:
Path(s) prioritization
Front page
Restrict to two paths chosen as follows:
Always pick the top interest path based on path interest prediction
Identify next set of high interest paths of the user with non-zero purchase incidence of at least a minimum threshold, say 1%, and calculate relative proportions of the path predictions, i.e., $\tilde{\pi}_{pn}$ from $\pi_{pn}$
Randomly select the second path so that, over time, the extra path is selected in proportion to the user's path predictions
The random seed(s) used in generating the random selection is fixed for the time-of-day to eliminate variations of selected paths within the same "time-of-day". That is, the chosen paths shouldn't change too quickly or often.
More page
Do the same as in "Front page" but choose 3 paths instead of just two, i.e., select two random paths instead of just one.
Cohort prioritization: For each selected path and each choice set type, say for example, "own" choice set:
Pick the top cohort $c_1*(p)$ based on maximum $Q^O_{c(p)n}$ across the cohorts. If the difference between $Q^O_{c_1*(p)n}$ and the next highest cohort probability is less than a threshold, say 0.1, then keep the second cohort as well.
In the process, keep one or two cohorts for each path and choice set type. The cohort probabilities can be rescaled to obtain $\tilde{Q}^O_{c_1*(p)n}$ (equals 1 if only the top cohort is kept for the choice set) and $\tilde{Q}^O_{c_2*(p)n}$ for "own" choice set, and $\tilde{Q}^S_{c_1*(p)n}$ and $\tilde{Q}^S_{c_2*(p)n}$ for the "similar" choice set.
With the rescaled probabilities $\tilde{\pi}$ and $\tilde{Q}$ and the choice set proportions R, in principle, construct the number of slots for each cohort, choice set and path in the front and more pages and assemble the playlist recommendations.

A choice set constructed for one user can also be used to make recommendations to a substantially similar user. This type of choice set might be used, for example, if two users have similar path preferences but one user has a larger history than the other. The larger history of one user can provide a rich choice set well suited to the other user.

Each recommendation may also be presented with an explanation for the recommendation. One way to explain a recommendation is to provide a cause for inclusion based on something from the user's history. For example, the system might state that a particular recommendation was offered because it is similar to a specific album the user previously selected. Recommendations can be linked to the user's history when the recommendation is determined, scored, or presented. The link may be established by a reverse similarity test where the system looks through the user's own history to find music similar to the recommendation. The system can also use a reverse similarity test to induce variety in the links. It may be that the recommendation system presented several recommendations initially linked to one history event. The system may present these recommendations as though they were suggested by distinct events.

The system and all of the functional operations described in this specification can be implemented in digital electronic circuitry, or in computer hardware, firmware, software, or in combinations of them. The system can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the approach can be performed by one or more programmable processors executing a computer program to perform functions of the system by operating on input data and generating output. Method steps can also be performed by, and apparatus of the system can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the system can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

It is to be understood that the foregoing description is intended to illustrate and not to limit the scope of the invention, which is defined by the scope of the appended claims. Other embodiments are within the scope of the following claims.

What is claimed is:

1. A computer-implemented method comprising:
    forming, using a choice set module, one or more choice sets of recommendable items, including forming for a first user at least one personalized choice set of recommendable items based in part on first data associated with the first user, wherein the recommendable items are divided into classification groups and the first data includes the first user's classification group preferences, and forming the at least one personalized choice set of recommendable items is based on the first user's classification group preferences; and
    forming, using a recommendation set module, a recommendation set of recommendable items, including selecting one or more of the recommendable items included in the one or more choice sets of recommendable items, where forming the recommendation set is based in part on second data associated with the first user, the second data not used in forming the personalized choice set.

2. The method of claim 1, further comprising:
    presenting, using a presentation module, the recommendation set of recommendable items to the first user.

3. The method of claim 1, wherein the first data includes a user activity history associated with the first user.

4. The method of claim 1, wherein the second data includes preference data for the first user.

5. The method of claim 4, wherein the preference data is derived at least in part from a user activity history associated with the first user.

6. The method of claim 1, wherein:
    forming the recommendation set includes applying configurable criteria not specific to the first user, the configurable criteria also not used in forming a choice set.

7. The method of claim 1, wherein each of at least some of the recommendable items is associated with a corresponding creative party.

8. The method of claim 1, wherein the recommendable items comprise media items and/or aggregations of media items.

9. The method of claim 8, wherein media items comprise audio items.

10. The method of claim 9, wherein each of at least some of the audio items is associated with a corresponding creative party, the creative parties including an artist of an item.

11. The method of claim 10, wherein:
forming the personalized choice set includes selecting items associated with creative parties represented by items in a user history associated with the first user.

12. The method of claim 10, wherein:
forming the personalized choice set includes selecting items associated with creative parties similar to creative parties represented by items in a user history associated with the first user.

13. The method of claim 1, wherein the recommendable items are associated with attributes.

14. The method of claim 13, wherein one or more choice sets of recommendable items is restricted to items sharing at least one common attribute.

15. The method of claim 13, wherein:
the second data about the first user includes recommendable item attribute preferences; and
the recommending one or more recommendable items from the one or more personalized sets to the first user is based in part on the first user's recommendable item attribute preferences.

16. The method of claim 15, wherein:
the second data includes recommendable item attribute preferences of one or more additional users; and
the recommending one or more recommendable items from the one or more choice sets to the first user is based in part on the recommendable item attribute preferences of one or more additional users.

17. A computer-implemented method comprising:
forming, using a choice set module, one or more choice sets of recommendable items, including forming for a first user at least one personalized choice set of recommendable items using a first method of a first methodology, the first method being adapted to the first user, wherein the recommendable items are divided into classification groups and the first method is adapted to the first user according to the first user's classification group preferences; and
forming, using a recommendation set module, a recommendation set of recommendable items, including selecting one or more of the recommendable items included in the one or more choice sets of recommendable items using a second method different than the first method, the second method being adapted to the first user.

18. The method of 17, wherein the second method is of a second methodology different from the first methodology.

19. The method of claim 17, further comprising:
presenting, using a presentation module, the recommendation set of recommendable items to the first user.

20. The method of claim 17, wherein the first methodology comprises an item correlation based methodology.

21. The method of claim 17, wherein the second methodology comprises a user profile based methodology.

22. The method of claim 17, wherein the recommendable items comprise media items and/or aggregations of media items.

23. The method of claim 22, wherein the media items comprise audio items.

24. Software stored on a computer readable media comprising instructions for causing a computer system to:
form one or more choice sets of recommendable items, including forming for a first user at least one personalized choice set of recommendable items based in part on first data associated with the first user, wherein the recommendable items are divided into classification groups and the first data includes the first user's classification group preferences, and forming the at least one personalized choice set of recommendable items is based on the first user's classification group preferences; and
form a recommendation set of recommendable items, including selecting one or more of the recommendable items included in the one or more choice sets of recommendable items, where forming the recommendation set is based in part on second data associated with the first user, the second data not used in forming a personalized choice set.

* * * * *